United States Patent [19]

Nicholson

[11] 4,024,335
[45] May 17, 1977

[54] HOMOGENEOUS HYDROXY-ALKYLATION OF CELLULOSE

[75] Inventor: Myron Donald Nicholson, St. Albans, W. Va.

[73] Assignee: Union Carbide Corporation, New York, N.Y.

[22] Filed: May 4, 1976

[21] Appl. No.: 683,111

[52] U.S. Cl. .................. 536/95; 252/364; 252/DIG. 4; 536/96

[51] Int. Cl.² .......................................... C08B 11/00

[58] Field of Search .......... 536/95, 96; 252/DIG. 4, 252/364

[56] References Cited

UNITED STATES PATENTS

| | | | |
|---|---|---|---|
| 1,234,720 | 7/1917 | Bloch-Pimentel | 8/116.4 |
| 1,863,208 | 6/1932 | Schorger | 536/96 |
| 2,679,449 | 5/1954 | Schappel | 536/99 |
| 3,023,183 | 2/1962 | Nelson | 252/DIG. 4 |
| 3,236,669 | 2/1966 | Williams | 106/163 |
| 3,278,521 | 10/1966 | Klug | 106/169 |
| 3,644,082 | 2/1972 | Berni et al. | 8/120 |

OTHER PUBLICATIONS

"The New Cellulose Solvent: Dimethyl Sulfoxide–Paraformaldehyde", Johnson et al., 39th Executive Conference, The Institute of Paper Chemistry, Appleton, Wisconsin, May 8, 1975.
"Dimethyl Sulfoxide/Paraformaldehyde: A Nondegrading Solvent for Cellulose", Johnson et al., Technical Paper Series No. 5, Apr. 1975 (first presented at The Eighth Cellulose Conference at Syracuse, New York, May 19–23, 1975.

*Primary Examiner*—Ronald W. Griffin
*Attorney, Agent, or Firm*—Bernard Francis Crowe

[57] ABSTRACT

A solvent mixture consisting of dimethyl sulfoxide and formaldehyde is used for the hydroxy-alkylation of cellulose.

6 Claims, No Drawings

HOMOGENEOUS HYDROXY-ALKYLATION OF CELLULOSE

BACKGROUND OF THE INVENTION

This invention pertains to the hydroxy-alkylation of cellulose and more particularly to the use of a dimethyl sulfoxide/formaldehyde solvent mixture.

Hydroxyalkyl celluloses have been made for the most part via two-step processes employing aqueous alkali treatment prior to the alkylene oxide reaction. The alkali cellulose produced by interaction of caustic with cellulose, either in sheet or slurry form, is etherified with a 1,2-alkylene oxide in the presence of a diluent. In commercial practice the etherified product (slurry) is neutralized with acid and the resulting salts removed by a series of aqueous alcohol extractions. The final product is then dried.

This technique for the production of hydroxyalkyl cellulose is undesirable for a number of reasons. First, the strong alkali treatment of the cellulose which results in swelling and enhanced accessibility causes a substantial reduction in the cellulose chain length (degree of polymerization). Also the heterogeneous nature of the reaction between cellulose and alkylene oxide results in low oxide efficiency and non-uniform reaction of the cellulose hydroxyl groups. Finally, all the salts formed upon neutralization of the alkali must be removed together with other impurities (such as glycols and glycol ethers) which are by-products of reaction with the diluent.

SUMMARY OF THE INVENTION

It has now been found that the hydroxy-alkylation of cellulose with a 1,2-alkylene oxide can be carried out without the difficulties encountered in the prior art methods by using as a menstruum or reaction solvent a mixture of dimethyl sulfoxide and formaldehyde.

The ratio of dimethyl sulfoxide to formaldehyde is not narrowly critical because the formaldehyde which functions to solubilize the cellulose in the dimethyl sulfoxide can be present in excess without altering the dissolution effect. The ratio of cellulose to dimethyl sulfoxide is determined by the course and molecular weight of the particular cellulose sample to be hydroxyethylated, which in turn determines its solubility. For example, cotton (high degree of polymerization) can be dissolved up to concentrations of 3–4% by weight while materials having lower degrees of polymerization can be dissolved to concentrations of 10–15% by weight. Higher concentrations of cellulose may be effected if desired. However, the viscosity of solutions containing cellulose concentrations above 15% makes handling very difficult and hence is a limiting factor. The theoretical required ratio of formaldehyde to cellulose is very close to 0.2:1 however, in an open vessel where losses are encountered it is preferable to use 1 to 1.5:1.

The hydroxy-alkylation of cellulose in this invention can be carried out, either in a closed or open reactor system. An open vessel is convenient for small scale laboratory preparations. A closed reactor is preferred for large scale operations because of dangers involved in handling certain alkylene oxides such as explosions and run-away polymerizations.

Pressure is not critical and so one may use subatmospheric or super-atmospheric pressures as well as atmospheric pressures.

The temperature at which the cellulose is dissolved in the mixture of dimethyl sulfoxide and formaldehyde is not narrowly critical but should be below about 140° C.

The temperature at which the solution is treated with the 1,2-alkylene oxide to effect hydroxy-alkylation is not narrowly critical but is preferably in the range of about 10° to 100° C. It is even more preferred to use a temperature of about 20° to about 60° C.

The time required for the hydroxy-alkylation of the cellulose solution is not narrowly critical but in order to obtain significant yields a time of at least 1 hour should be allowed. It is preferred to use a time of about 2 to about 60 hours. There is no maximum time since no degradation takes place upon prolonged exposure of the cellulose solutions to the alkylene oxide reagent.

In a preferred embodiment of this invention the cellulose to be hydroxy-alkylated is first slurried in dimethyl sulfoxide starting at room temperature and gradually raising the temperature to about 125° C. with stirring. This operation is usually complete in about 2 hours. At this point formaldehyde is introduced to the hot slurry as such or in the form of a polymer of formaldehyde, viz., paraformaldehyde. Under the conditions hereinabove described paraformaldehyde decomposes to gaseous monomeric formaldehyde. There is initially a thickening of the slurry at this point followed within a matter of seconds by complete dissolution of the cellulose. The amount of formaldehyde used is not critical since any excess is expelled by heating at about 110° C., and does not effect the homogeneous cellulose solution.

While either an open or closed vessel can be used to effect dissolution of the cellulose, a closed system is more efficient since formaldehyde gas loss is eliminated. The closed system also has the advantage of permitting one to initially mix cellulose, dimethyl sulfoxide, and formaldehyde or paraformaldehyde without any interaction. Upon heating, the formaldehyde originally present is liberated from the paraformaldehyde and results in the dissolution of the cellulose. It is postulated that the dissolution of the cellulose in dimethyl sulfoxide takes place when methylol cellulose is formed by the interaction of the cellulose C-6 hydroxyl groups with formaldehyde.

Any source of cellulose, a polymer of anhydroglucose monomer units, can be used including wood, cotton, and the like.

The dimethyl sulfoxide solutions of methylol cellulose afforded by the procedure described above are then contacted with a suitable 1,2-alkylene oxide in order to produce the corresponding hydroxyl alkyl cellulose ethers. A preferred alkylene oxide is ethylene oxide, although 1,2-propylene oxide and 1,2-butylene oxide can be used as well as styrene oxide. The hydroxy-alkylation procedures are known in the art and generally call for the use of a suitable catalyst, such as alkali metal hydroxides, including sodium hydroxide, potassium hydroxide, and the like; alkyl amines, including dimethylamines, diethylamine, triethylamine, and the like; alkanolamines, including diethanolamines, triethanolamine, and the like; alkylene diamines, including ethylene diamine, butylene diamine, tetramethyl-1,3-butane diamine and the like; and inorganic salts including zinc chloride, aluminum trichloride, stannic chloride, boron trifluoride, and the like.

In the case of pressure hydroxy-alkylations, it is convenient to add the catalyst to the solution of cellulose in the dimethyl sulfoxide/formaldehyde mixture and then pressure the reaction vessel with the appropriate alkylene oxide. Agitation of the viscous reaction mixture insures homogeneity of the reaction and subsequent hydroxyalkyl group distribution. The relative number of hydroxyalkyl substituents is commonly designated as the degree of substitution (which is the number of moles of cellulose hydroxy groups bearing a substituent per anhydroglucose unit) or molar substitution (which is defined as the number of moles of hydroxyalkyl substituents per mole of anhydroglucose units). It will be understood by those skilled in the art that the 1,2-alkylene oxide agent used can react with either a cellulose hydroxyl group or an hydroxyl group of the hydroxy alkyl group substituent.

The system used for the preparation of the hydroxy alkyl celluloses according to this invention should be kept relatively free of moisture since the original cellulose is regenerated from the methylol cellulose by water. It is also regenerated by aliphatic alcohols, ketones, and the like, as well as by temperatures above 140° C.

After the hydroxy-alkylation of cellulose is complete, the hydroxy alkyl cellulose can be recovered by precipitation with miscible nonsolvents such as aliphatic alcohols. The extent of hydroxyalkyl substitution of the cellulose can be determined on the final product by the Morgan Method (Ind. Eng. Chem., Anal. Ed., Vol. 18, pg. 500 [1946]).

The invention is further described in the examples which follow. All parts and percentages are by weight unless otherwise specified.

EXAMPLE 1

CELLULOSE DISSOLUTION IN DIMETHYL SULFOXIDE/FORMALDEHYDE

To a 2-liter beaker was charged 1000 grams of dimethyl sulfoxide and 30 grams of cellulose in the form of cotton. The resultant slurry was stirred with a magnetic stirring hot plate apparatus while the temperature was raised from room temperature to 125° C. over a period of about 2 hours. Then 40 grams of paraformaldehyde (photograde 97% pure) was added. The paraformaldehyde decomposed immediately liberating formaldehyde gas which was dispersed in the cellulose-dimethyl sulfoxide slurry by the stirring action. The cellulose dissolved quickly in a matter of about 15 to about 30 seconds. Continued heating of this solution at 110° C. expelled in excess formaldehyde from the solution. The viscous solution, containing about 3% by weight of cellulose, was stable for extended periods provided it was kept free from moisture or temperatures in excess of about 140° C.

EXAMPLES 2–9

HYDROXY-ETHYLATION OF CELLULOSE IN DIMETHYL SULFOXIDE/FORMALDEHYDE SOLUTION

A sample of cellulose dissolved in dimethyl sulfoxide/formaldehyde prepared as in Example 1 was diluted with more dimethyl sulfoxide so that the cellulose content was 1.3 grams/200 grams of dimethyl sulfoxide. This was charged to a 250 ml. pressure bottle together with 1 gram of sodium hydride as an etherification catalyst. The bottle was agitated for 5 minutes and then 4 grams of ethylene oxide was introduced by means of a syringe and the vessel capped. The reaction was allowed to proceed at 22' C. for about 3 hours. The contents of the bottle were poured into excess acidic isopropanol thereby precipitating hydroxyethyl cellulose while decomposing excess sodium hydride. The hydroxyethyl cellulose was filtered and washed with excessive isopropanol washes until free of sodium salt and dimethyl sulfoxide. The dried final product was shown by the Morgan Method to have an hydroxyethyl substitution of 5.8.

A sample of the cellulose solution dissolved in dimethyl sulfoxide/formaldehyde prepared in Example 1 was diluted with dimethyl sulfoxide until the solids content was 2 grams of cellulose/100 grams of dimethyl sulfoxide. As in the Example above it was placed in a 250 ml. pressure bottle but with 1 gram of potassium hydroxide as catalyst. After agitation for 5 minutes 15 grams of ethylene oxide was charged, the bottle sealed and reaction allowed to take place for 2 hours to 22° C. The dried and washed hydroxyethyl cellulose amounted to 2.2 grams, was soluble in water and had an hydroxyethyl substitution of 2.0, as determined by the Morgan Method.

Another sample of the cellulose solution from Example 1 was diluted to obtain a sample containing 2.7 grams/200 grams of dimethyl sulfoxide. This again was charged to a 250 ml. pressure bottle but with 3 grams of triethanolamine as catalyst. After agitation for 5 minutes, 10 grams of ethylene oxide was charged to the bottle which was sealed and agitated on a can roller for 60 hours at 22' C. The washed and dried hydroxyethyl cellulose product (3.5 g.) was soluble in water and showed an hydroxyethyl substitution of 1.2 by the Morgan Method.

On the average, hydroxyethyl celluloses become water soluble with a molar substitution of at least 1.0. Moreover, between 0.5–1.0 they are alkali (2%) soluble while below 0.5, insoluble. In some cases this solubility check was used to estimate the molar substitution of the material prepared.

Another sample of cellulose solution obtained from Example 1 was diluted to a solids content of 2.4 grams/200 grams of dimethyl sulfoxide and placed in a 250 ml. pressure bottle together with 1 gram of diethylamine as catalyst. This was agitated for 5 minutes and then 7.3 grams of ethylene oxide was charged and the bottle sealed. The bottle was agitated on the can roller for 24 hours at 22° C. The hydroxyethyl cellulose product was precipitated in isopropanol as above, washed and dried and found to be water insoluble. It showed an hydroxyethyl substitution of 0.6 by the Morgan Method.

Another cellulose solution sample from Example 1 was diluted to a point where the solids content was 2.7 grams/200 grams of dimethyl sulfoxide. It was placed in a 250 ml. pressure bottle together with 3 grams of zinc chloride as catalyst and agitated for 5 minutes. Then 10 grams of ethylene oxide was charged, the bottle sealed and agitated on the can roller for 24 hours at 22° C. The hydroxyethyl cellulose recovered by precipitation in isopropanol was water insoluble and showed an hydroxyethyl substitution of 0.5 by the Morgan Method.

Another diluted sample from Example 1 containing 2.7 grams of cellulose/200 grams dimethyl sulfoxide was charged to a pressure bottle with 1 gram of triethanolamine as catalyst and agitated for 5 minutes. Bottle was then charged with 5 grams of ethylene oxide, sealed and agitated on can roller for 23 hours at 60° C. The hydroxyethyl cellulose product was recovered by precipitation in isopropanol, washed and dried. It was water insoluble and showed an hydroxyethyl substitution of 0.4 by the Morgan Method.

Another sample from Example 1 diluted to contain 2.7 grams of cellulose/200 grams of dimethyl sulfoxide was charged to a 250 ml. pressure bottle with 0.9 grams of triethanolamine as catalyst. It was agitated for 5 minutes and then charged with 5 grams of ethylene oxide, sealed and agitated on a can roller for 23 hours at 60° C.

Hydroxyethyl cellulose was recovered by precipitation in isopropanol and after washing and drying an hydroxyethyl substitution of 0.4 by the Morgan Method was recorded for this product.

A sample of cellulose solution from Example 1 was diluted to a point where the solids content was 1.5 grams/100 grams dimethyl sulfoxide. This was charged to a 250 ml. pressure bottle with 1 gram of tetramethylbutanediamine as catalyst. The bottle was agitated for 5 minutes and then charged with 5 grams of ethylene oxide, sealed and agitated on a can roller for 22 hours at 55° C. The hydroxyethyl cellulose product after precipitation in isopropanol, washing and drying was alkali soluble and showed an hydroxyethyl substitution of 0.5 by the Morgan Method.

EXAMPLE 10

When Example 2 is repeated with the exception that 1,2-propylene oxide is substituted for the ethylene oxide, a hydroxypropyl cellulose ether product is obtained.

EXAMPLE 11

When Example 2 is repeated with the exception that 1,2-butylene oxide is substituted for the ethylene oxide, a hydroxybutyl cellulose ether is obtained.

Although the invention has been described in its preferred form with a certain degree of particularity, it is understood that the present disclosure of the preferred form has been made only by way of example and numerous changes may be restored to without departing from the spirit and scope of the invention.

What is claimed is:

1. The method of hydroxy-alkylating cellulose which comprises contacting a slurry of cellulose and dimethyl sulfoxide containing up to about 15 percent cellulose with sufficient formaldehyde to effect a homogeneous solution and then contacting said solution with a 1,2-alkylene oxide in the presence of a catalyst at a temperature of about 0° and 110° C. for at least one hour.

2. Method claimed in claim 1 wherein the concentration of cellulose in the homogeneous solution is about 15%.

3. Method claimed in claim 1 wherein the 1,2-alkylene oxide is ethylene oxide.

4. Method claimed in claim 1 wherein the 1,2-alkylene oxide is 1,2-propylene oxide.

5. Method claimed in claim 1 wherein the 1,2-alkylene oxide is 1,2-butylene oxide.

6. Method claimed in claim 1 wherein the 1,2-alkylene oxide is contacted with the homogeneous solution at a temperature of about 20° C. to about 60° C.

* * * * *